United States Patent [19]
Laakmann

[11] 3,723,642
[45] Mar. 27, 1973

[54] THERMAL IMAGING SYSTEM

[75] Inventor: Peter Laakmann, Los Angeles, Calif.

[73] Assignee: Hughes Aircraft Company, Culver City, Calif.

[22] Filed: May 28, 1971

[21] Appl. No.: 147,924

[52] U.S. Cl. ........................178/6, 178/7.1, 178/7.6, 250/83.3 HP, 250/220 R
[51] Int. Cl. ............................H04n 3/08, H04n 5/30
[58] Field of Search .........178/5, 6, 7.1, 7.6, DIG. 34, 178/DIG. 8, DIG. 12; 250/83.3 H, 83.3 HP, 208, 220, 224

[56] References Cited

UNITED STATES PATENTS 3,646,265 2/1972 Eberhardt ......................178/DIG. 12
2,951,158 8/1960 Wooters ..............................250/208
3,614,194 10/1971 Harris ..................................178/7.6
3,604,838 9/1971 Sharp et al .......................178/DIG. 3
2,022,248 11/1935 Lofgren ................................178/7.1
3,044,297 7/1962 Hanken ..........................250/83.3 H

*Primary Examiner*—Robert L. Griffin
*Assistant Examiner*—Joseph A. Orsino, Jr.
*Attorney*—W. H. MacAllister, Jr. and Lawrence V. Link, Jr.

[57] ABSTRACT

A thermal imaging system wherein a field of view is optically scanned in a two-dimensional pattern by each element of a linear detector array. Output signals from each detector element are delayed as a function of the scan rate and the relative position of the element in the array, to allow the summation of signals from the same image segments, provided by the various elements of the array.

10 Claims, 5 Drawing Figures

Peter Laakmann,
INVENTOR.
BY.
Lawrence V. Link Jr.
ATTORNEY.

THERMAL IMAGING SYSTEM

BACKGROUND OF THE INVENTION

This invention relates generally to thermal imaging systems and more particularly to such systems wherein a linear detector array is optically scanned in a two-dimensional raster pattern.

Present thermal imaging equipment, such as infrared systems for example, use a more or less linear array of detectors oriented to cover one dimension of the field of view. Each detector element output signal is individually amplified and either multiplexed into a single line of video or connected on a one for one basis to an array of light emitting solid state of plasma diodes. The array is then swept across the field of view at a relatively slow rate either in a rectilinear, circular or semicular motion. A properly driven or synchronized display may then reconstruct the image as it appears on the detector focal plane.

The performance of these prior imaging techniques has proven satisfactory in many applications, however, they have certain disadvantages from a cost effectiveness point of view for other applications. In particular, the feature of using an array of elements to scan one dimension of the raster causes processing complications and requires detector arrays with a high proportion of elements of uniform characteristics. The equipment complexity results from raster offset, and equalization problems as well as DC restoration problems, all of which are inherent in the above described approach.

SUMMARY OF THE INVENTION

Therefore, it is a primary object of the subject invention to provide a cost effective thermal imaging system.

Another object is to provide thermal imaging systems which are relatively uncomplicated and which have improved reliability.

Still another object is to provide a versatile thermal imaging technique whereby resolution considerations do not necessarily control field of view and raster scan rate design parameters.

Yet another object of the invention is to provide an improved thermal imaging system in which video processing such as contrast control and frequency tailoring is performed in a single channel, and which minimizes raster offset and equalization problems as well as the need for DC restoration.

According to one preferred embodiment of the subject invention, a short linear array of detector elements is oriented parallel to the "line scan" dimension of the raster so that each element of the array optically scans the entire field of view. The output signals of the various detector elements are delayed as a function of each element's position within the array and the line scan rate. The delayed imaging signals from each detector element, originating from the same image segment, add to provide improved resolution (signal to noise ratio).

The quality of the performance of systems in accordance with the subject invention is comparable to that of the best or prior thermal imaging devices plus a significant reduction in system cost is realizable. The below listed advantages of the invention allows a reduction in equipment complexity ad increased reliability:

- Raster offset, equalization, and DC restoration problems are substantially eliminated as all portions of the image are scanned by all detectors;
- Reliability and uniformity requirements on the detector array elements are substantially reduced due to the fact that the output signals from all detectors are integrated to form a composite video signal;
- The number of detector elements can be selected for the desired degree of resolution, thereby providing a high degree of versatility in field of view and raster scan rate design considerations; and
- Video processing may be performed in a single channel thereby reducing the complexity of contrast control and frequency response tailoring circuitry.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DESCRIPTION OF THE PREFERRED EMBODIMENT

Figure 1:
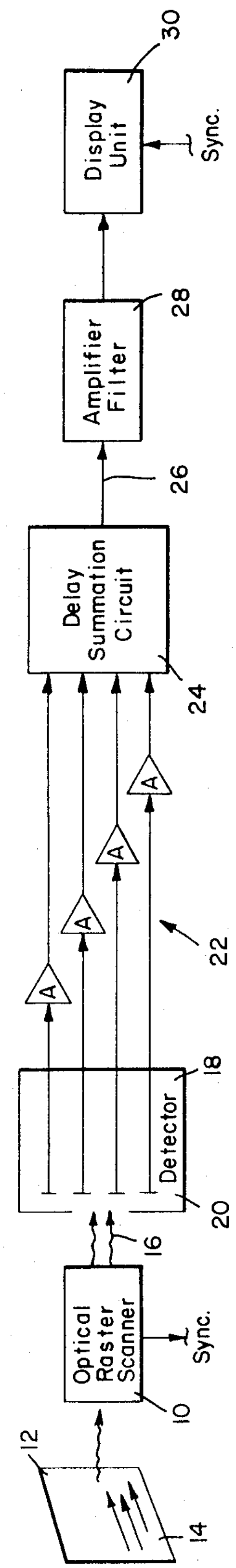
FIG. 1 is a block diagram of a thermal imaging system in accordance with the subject invention.

Referring first primarily to FIG. 1, optical raster scanner 10 scans a field of view 12 in a two-dimensional pattern 14, and positions a stationary optical beam 16 on a focal plane 20 of a detector 18. Detector 18 comprises a linear array of elements responsive to the intensity of beam 16 for providing output imaging signals as a function thereof. To maintain the clarity of the drawings, only four detector elements of the array are illustrated, however, it will be understood that as many elements as required for a desired degree of resolution may be employed — 25 to 50 elements being a more typical number.

The output signal from each of the detector elements is individually amplified by low noise, high gain amplifies 22 and applied to a delay summation circuit 24. Circuit 24 delays the imaging signals from the individual detector elements such that signals from the same segments of an image are in time coincidence. The combined, delayed video signals are applied on a lead 26 to a unit 28 wherein they are amplified and filtered prior to being applied to a display unit 30. Unit 30 may be a television type cathode ray tube display with horizontal and vertical synchronization pulses and video retrace blanking signals applied from raster scanner 10. Alternately, display unit 30 could comprise a two-dimensional array of light emitting solid state or plasma diodes with time multiplexing circuits controlled by the horizontal and vertical synchronization signals.

One scanner suitable for unit 10 is described in application Ser. No. 152,466 by Bryce A. Wheeler, filed concurrently herewith and assigned to the assignee hereof. Reference is now primarily directed to FIG. 2 wherein one embodiment of the above mentioned scanner is illustrated. As there shown, field of view 12 is scanned in a two-dimensional pattern by vertical mirror 30 and horizontal multifacted scan wheel 32. A motor 34 drives wheel 32 as well as a vertical drive pinion assembly 36.

Elevation mirror 30 is positioned about pivot shaft 38 by a cam assembly 40 which includes a cam follower 42 and a linear rise cam 44. Cam 44 is fixed to shaft 46 driven by gear 48; and follower 42 may be biased into engagement with the cam by a spring assembly (not shown).

The energy from field of view 12 is first reflected by a rotating horizontal scan mirror, such as surface 50 of wheel 32, and then by reciprocating vertical mirror 30. The rays transmitted by mirror 30 are focused by optics 52 and applied to focal plane 20 of detector 18 (FIG. 1). The scanner of FIG. 2 may be mechanized to provide a scan pattern having, for example, 525 horizontal scans per frame, 15 frames per second, and a field of view of 30° × 45°. A noninteger ratio between the horizontal and vertical scan rates may be used to provide an interlaced pattern.

Figure 2:
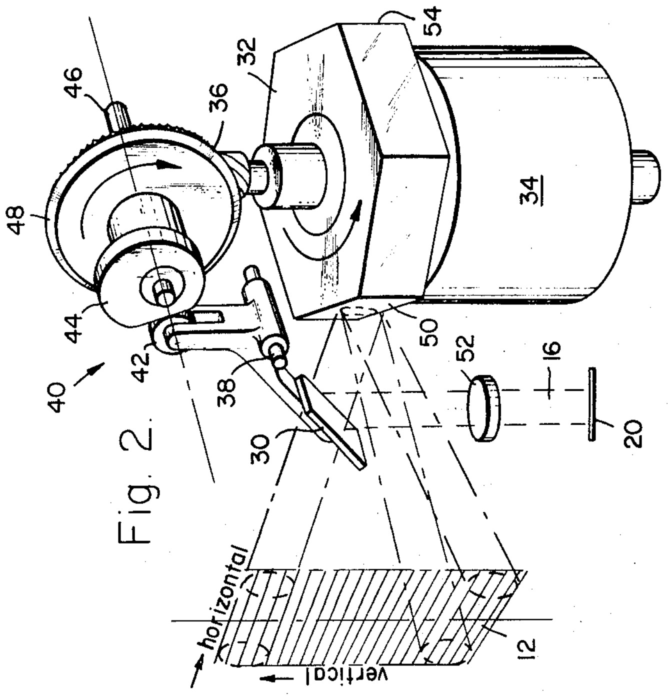
FIG. 2 is a perspective view of a portion of an optical raster scanner suitable for use in the system of FIG. 1.

The portion of scanner 10 shown in FIG. 2 does not include means for providing synchronization pulses, but suitable mechanizations therefore are well known in the art. For example, a capacitive pick-off which senses the peak of cam 44 could provide frame (vertical) synchronization and video blanking pulses; while a capacitive pick-off sensing the edges 54 of multifaceted scan wheel 32 could prove horizontal synchronization signals.

Figure 3:
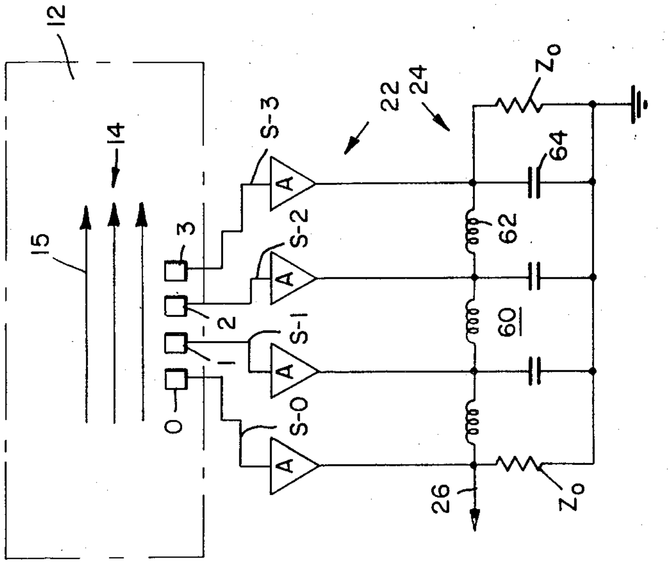
FIG. 3 is a block diagram of a portion of a linear detector array and associated signal processing circuits of the system of FIG. 1.

An important aspect of the subject invention is the scanning of a detector array and the processing of the output signals from the different elements thereof, such that signals from the same segments of the image integrate. As shown in FIG. 3, four elements of the array of detector 18 (labeled 0 through 3) are positioned such that there are parallel to the horizontal scan direction 15. For clarity of the drawing, the size and spacing between elements has been greatly exaggerated in FIG. 3; it being understood that in practice the elements may be small adjacent sections of a single strip of solid state material. As any given point in the field of view 12 is scanned across the array 18 it will activate detector 3, then 2, 1, and 0 in that order. In accordance with the invention, the output signal from each detector is delayed as a function of the horizontal scan rate ($v$ cm per second) and its position in the array. For example, if the center of the detector elements are uniformly displaced $x$ cm apart, then the output signal S–O from detector element 0 has no time delay applied thereto; signal S–1 is delayed for a period of $1\cdot x/v$ seconds; signal S–2 is delayed $2\cdot x/v$; signal S–3, $3\cdot x/v$; and so forth.

In FIG. 3, the delay and summation function is mechanized by means of a tapped delay line 60, each stage of which comprises an inductive element 62 and a capacitive element 64. Both ends of the delay line 60 are terminated in the characteristic impedance of the line, $Z_o$. The output signal from each of the detector elements are individually amplified and applied to selected ones of the input taps of delay line 60 such that the proper delay values are applied.

Figure 4A:
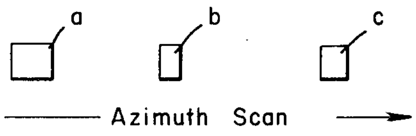
FIG. 4a is a sketch of various thermal sources in the field of view of the system of FIG. 1.
Figure 4B:
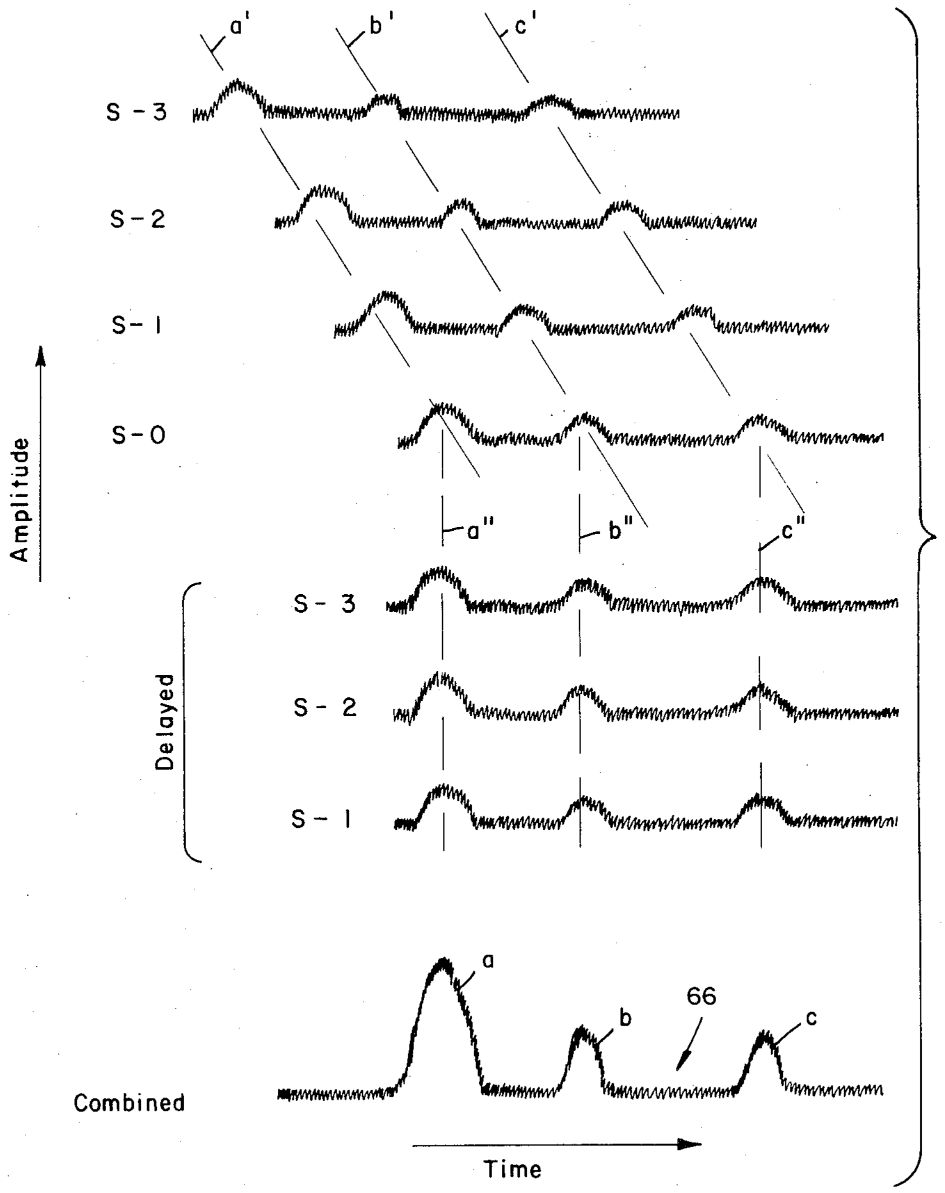
FIG. 4b is a timing diagram of the systems response to these sources for explaining its operation.

The output signals from each of the detector elements, corresponding to image segments $a$, $b$ and $c$ of FIG. 4a, are shown in the first four rows of FIG. 4b. As indicated by diagonal lines $a'$, $b'$ and $c'$ in FIG. 4b, the signals from a particular point of the field of view, from each of the various detector elements, are displaced in time from one another in a linear fashion. Rows 5 through 7 of FIG. 4b illustrate the delayed output signals with the signals corresponding to the same image segment being in time coincident. This condition is indicated by the vertical lines $a''$, $b''$ and $c''$.

Waveform 66 of FIG. 4b illustrates the approximate signal-to-noise ratio enhancement resulting from the embodiment of FIG. 3. it is again noted that in practice many more than four detector elements would be used to form the array; and it is expected that the signal-to-noise ratio improvement would approximate the $\sqrt{N}$, where N is the number of detector elements forming the linear array.

For a given degree of resolution, other systems in which the detector array completely covers one dimension of the field of view, as the array is scanned in the other dimension, require a much slower frame rate (higher flicker rate) than do systems of the subject invention. The subject systems compensate for faster scan speeds of the detector elements by integrating the delay compensated signals from a plurality of elements. An important advantage of the subject invention is that each element views each point within the field of view and hence raster offset, equalization and DC restoration problems, encountered in the other system, are substantially avoided. Not only is uniformity of detection element response not of significance in systems in accordance with the invention, but the array may have a percentage of defective elements without significantly degrading the quality of the display; as the number of total elements in the array may be selected in the original design to compensate for the yield ratio of good elements. This feature greatly reduces manufacturing cost of the arrays. In the subject systems defective elements do not produce blank portions in the display but only slightly decease the signal-to-noise ratio; and this decrease in signal-to-noise ratio due to defective elements may be compensated by originally including a larger number of total array elements in the design. Versatility results from the fact that a given degree of resolution may be readily designed into systems of differing scan rates and field of view limits merely by a corresponding change in the number of array elements.

The invention has been referred to herein as a thermal imaging system for lack of a more generic term. However, it is understood that the invention is not limited to any particular frequency range, such as the infrared spectrum, for example. Rather, the invention has wide applicability to systems in which detection elements are utilized in such a manner that discrete electrical output signals are obtained from each of the elements.

Thus, there has been described a cost effective and versatile system that provides high resolution imagery with a significant reduction in the equipment complexity.

What is claimed is:

1. A thermal imaging system comprising:

an array of detection elements, with each said detection element adapted for producing an output signal representative of the relative intensity of thermal energy applied thereto;

means for scanning a field of view in two dimensions and applying the received thermal energy to said array; and means for processing the output signals from each of said detection elements to cause the signals from each of the elements, originating from the same segment of the field of view, to be summed so as to provide a resultant output signal indicative of the relative thermal energy distribution within said field of view.

2. The system of claim 1 wherein said array is a linear array of detection elements oriented parallel to one of the scanning dimensions.

3. The system of claim 1 wherein said means for processing includes means for delaying the output signals from said detection elements as a function of the scan rate along one of said scanning dimensions and the element's position within the array.

4. The system of claim 1 wherein said means for processing includes a tapped delay line with each of said detection elements coupled to a different input tap.

5. The system of claim 3 wherein said means for processing includes a delay line having a plurality of input taps and each of said detection elements are coupled to a different one of said input taps.

6. The system of claim 1 wherein said scanning means includes means for pointing a stationary optical beam through a two-dimensional raster pattern, and means for focusing the beam on a focal plane.

7. The system of claim 6 wherein said scanning means includes means for scanning said raster pattern in horizontal and vertical dimensions; and said array is a linear array of detection elements oriented on said focal plane such that the linear dimension of the array is approximately parallel to the horizontal scan direction.

8. The system of claim 7 wherein said means for processing includes means for delaying the output signals from each of the detection elements as a function of the horizontal scan speed and the relative position of each of the detection elements along the linear array.

9. The system of claim 8 wherein said means for processing includes a delay line having a plurality of input taps and each of said detection elements are coupled to a different one of said input taps.

10. The system of claim 9 further comprising a display device synchronized to said scanning means; and means for applying output signals from said delay line to the video input of said display device.

* * * * *